(12) United States Patent
Chambers et al.

(10) Patent No.: US 6,845,943 B2
(45) Date of Patent: Jan. 25, 2005

(54) APPARATUSES AND METHODS FOR PREVENTING FOREIGN OBJECT DAMAGE TO AIRCRAFT ENGINES

(75) Inventors: David S. Chambers, Bellevue, WA (US); Justin D. Cottet, Snohomish, WA (US); David W. Foutch, Seattle, WA (US); Mark N. Simpson, Kirkland, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/690,739

(22) Filed: Oct. 20, 2003

(65) Prior Publication Data

US 2004/0079836 A1 Apr. 29, 2004

Related U.S. Application Data

(60) Provisional application No. 60/420,748, filed on Oct. 22, 2002.

(51) Int. Cl.[7] .............................................. B64C 25/16
(52) U.S. Cl. ................................ 244/103 R; 244/53 B; 244/121
(58) Field of Search .......................... 244/121, 117 R, 244/119, 102 R, 103 R, 53 B, 100 R, 129.4

(56) References Cited

U.S. PATENT DOCUMENTS 2,814,454 A * 11/1957 Atkins et al. ............ 244/102 R
4,408,736 A * 10/1983 Kirschbaum et al. ..... 244/100 R
4,412,665 A * 11/1983 Kramer et al. .......... 244/102 R
4,638,962 A * 1/1987 Gunter et al. ............... 244/203
4,674,712 A * 6/1987 Whitener et al. ........... 244/119
5,000,400 A * 3/1991 Stuhr .................... 244/102 R
6,651,928 B1 * 11/2003 Stuhr ....................... 244/53 B

OTHER PUBLICATIONS

Aero 13—Runway Arresting System, Copyright 2003 The Boeing Company (7 pages) http://www.boeing.com/commercial/aeromagazine/aero_13/runway_story.html [Accessed Oct. 3, 2003].

737–200 Nosegear Gravel Deflector Photograph, Copyright 2003 The Boeing Company (1 page) http://www.boeing.com/commerical/aeromagazine/aero_13/runway_fig4.html [Accessed Oct. 3, 2003].

* cited by examiner

Primary Examiner—Galen Barefoot
(74) Attorney, Agent, or Firm—Perkins Coie LLP

(57) ABSTRACT

Apparatuses and methods for preventing foreign object damage (FOD) to aircraft engines are disclosed. In one embodiment, a deployable blocker is coupled to a wing portion and/or a fuselage portion of the aircraft and is configured to prevent debris from travelling on a direct trajectory from a landing gear wheel to an engine air inlet. In other embodiments, the blocker can prevent debris from bouncing off the wing lower surface into the engine inlet, or sticking to the wing lower surface and falling into the engine inlet. The deployable blocker can cover at least a portion of the landing gear when the landing gear is retracted and the blocker assembly stowed. In another embodiment, the blocker can be mounted to the landing gear.

53 Claims, 5 Drawing Sheets

APPARATUSES AND METHODS FOR PREVENTING FOREIGN OBJECT DAMAGE TO AIRCRAFT ENGINES

CROSS-REFERENCE TO RELATED APPLICATIONS

The present application claims priority to U.S. Provisional Application 60/420,748, filed Oct. 22, 2002 and incorporated herein in its entirety by reference.

TECHNICAL FIELD

The following disclosure relates generally to apparatuses and methods for preventing foreign object damage (FOD) to aircraft engines and, more particularly, to main landing gear door assemblies and other blocking structures for preventing FOD to aircraft engines.

BACKGROUND

Foreign object damage (FOD) to an aircraft engine can cause an unexpected engine shut-down or an unscheduled engine replacement. Such FOD can be caused by various types of debris, including runway debris (e.g., water, gravel, nuts and bolts, etc.) and aircraft debris (e.g., tire pieces, accumulated ice, landing gear parts, etc.). These types of debris can be thrown or otherwise propelled into the engine inlet by a landing gear wheel during take-off or landing, especially if the wheel is positioned forward of the engine air inlet. Existing structures for preventing foreign materials from being ingested into the engine inlet may be heavy and/or may not block all such materials. For example, some existing devices may block water but not solid objects, and others may block only certain material trajectories.

SUMMARY

The present invention is directed generally toward aircraft devices for intercepting foreign objects to prevent foreign object damage. An aircraft in accordance with one aspect of the invention includes a fuselage portion, a wing portion coupled to the fuselage portion, and an engine nacelle having an air inlet and depending from at least one of the fuselage portion and the wing portion. A landing gear can also depend from at least one of the wing portion and the fuselage portion. A deployable blocker can be coupled to at least one of the wing portion and the fuselage portion and can be movable between a stowed position and a deployed position, with at least a portion of the blocker being located between the landing gear and the air inlet when in the deployed position to prevent at least a solid object propelled by the landing gear from entering the air inlet.

In a further aspect of the invention, the landing gear is movable between an extended position and a retracted position, and the blocker can cover at least a portion of the landing gear when the landing gear is in the retracted position and the blocker is in the stowed position. The landing gear can include at least one tire and the blocker can intersect a straight line extending between the at least one tire and the air inlet. In another embodiment, the blocker can prevent at least a solid object propelled by the landing gear from striking a lower surface of the wing portion and then entering the inlet. In still another embodiment, the blocker can include a blocker device positioned between an upper surface of a landing gear tire and at least one of the wing portion, the fuselage portion, and the engine nacelle to intercept at least a solid object propelled by the landing gear. The blocker device can be supported by the landing gear from a position below the blocker device.

A method in accordance with another aspect of the invention includes extending the landing gear of an aircraft, engaging the landing gear with the ground, and moving the aircraft along the ground on the landing gear. The method can further include preventing at least a solid object propelled by the landing gear from entering an engine inlet of the aircraft by moving a deployable blocker coupled to at least one of the wing portion and the fuselage portion of the aircraft from a stowed position to a deployed position to place at least a portion of the blocker between the landing gear and the inlet. In a further aspect of this embodiment, the method can include preventing a tire fragment from entering the inlet. In other particular embodiments, the method can include preventing at least a solid object from striking at least one of the wing portion and the fuselage portion and then bouncing into the inlet, and/or sticking to at least one of the wing portion and the fuselage portion and falling into the inlet.

DETAILED DESCRIPTION

The following disclosure describes blocker devices, including landing gear door assemblies and related structures for preventing FOD to aircraft engines. Certain specific details are set forth in the following description and the Figures to provide a thorough understanding of various embodiments of the invention. Certain well-known details often associated with aircraft and aircraft landing gears are not set forth in the following disclosure, however, to avoid unnecessarily obscuring the various embodiments of the invention. Further, those of ordinary skill in the relevant art will understand that they can practice other embodiments of the invention without several of the details described below.

Figure 1:
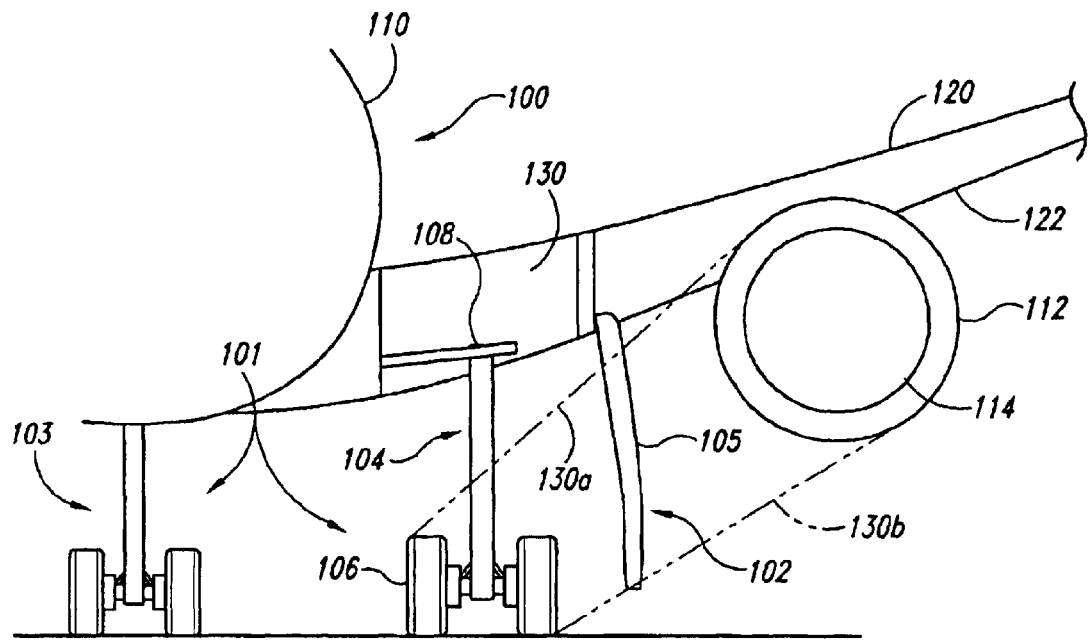
FIG. 1 is a front elevation view of a portion of an aircraft having a blocker assembly configured in accordance with an embodiment of the invention.

FIG. 1 is a front elevation view of a portion of an aircraft 100 having a blocker assembly 102 configured in accordance with an embodiment of the invention and positioned to intercept at least solid foreign objects and prevent them from striking other parts of the aircraft 100. Accordingly, the blocker assembly 102 can also intercept non-solid objects (e.g., water droplets or spray) and prevent them from striking other parts of the aircraft 100. In one aspect of this embodiment, the aircraft 100 is an aft wing aircraft having a wing or wing portion 120 extending outwardly from an aft portion of a fuselage or fuselage portion 110. The aircraft 100 can further include a smaller wing or canard (not shown) extending outwardly from the fuselage 110 forward of the wing 120. In other embodiments, the aircraft 100 can have other wing configurations. For example, in another embodiment, the aircraft 100 can have a mid-wing configuration or a blended wing-body configuration.

In another aspect of this embodiment, the aircraft 100 has landing gear 101, which includes a nose gear 103 and main landing gear 104 aft of the nose gear 103. An engine nacelle 112 is positioned above the landing gear 101 and can house a turbofan engine. Certain aspects of the invention, discussed below in the context of the main landing gear 104, are also applicable to other portions of the landing gear 101, for example, the nose gear 103. The main landing gear 104 can be pivotally attached to the wing 120 at a trunnion 108 and can include a wheel truck 106. The main landing gear 104 can be pivotable about the trunnion 108 to move the wheel truck 106 between a static deployed position for supporting the aircraft 100 on the ground (as shown in FIG. 1), and a static retracted position (not shown) in which the main landing gear 104 is stowed for flight in a wheel well 130 within the wing 120. For example, in the illustrated embodiment the main landing gear 104 is forwardly retractable into the wheel well 130 about the trunnion 108 between the static deployed position and the static retracted position. In other embodiments, the main landing gear 104 can retract in other directions. For example, in another embodiment, the main landing gear 104 can retract rearwardly into the wheel well 130. In a further embodiment, the main landing gear 104 can retract inwardly, at least partially into the fuselage 110.

In a further aspect of this embodiment, the engine nacelle 112 is fixedly attached at least proximate to a lower wing surface 122 and includes an engine air inlet 114. In the illustrated embodiment, the engine air inlet 114 is positioned at least generally aft of the wheel truck 106 when the wheel truck 106 is in the static deployed position. In another aspect of this embodiment, the blocker assembly 102 includes a solid and generally rigid panel 105 that is hingedly attached to the wing 120 and is movable between an open or deployed position (as shown in FIG. 1), and a closed or retracted position. In the closed position, the blocker assembly 102 can close off the wheel well 130 and can accordingly function as both a landing gear door and blocker for foreign objects. In the deployed position, the blocker assembly 102 extends downwardly to block at least some (and in at least one embodiment, all) direct lines-of-sight between the wheel truck 106 and the engine air inlet 114. Such lines-of-sight can be defined by the region extending between lines 130a and 130b. Accordingly, the blocker assembly 102 of the illustrated embodiment prevents debris generated, kicked-up or otherwise propelled by the wheel truck 106 from travelling on a direct trajectory to the engine air inlet 114 and being ingested by the engine nacelle 112.

Figure 2:
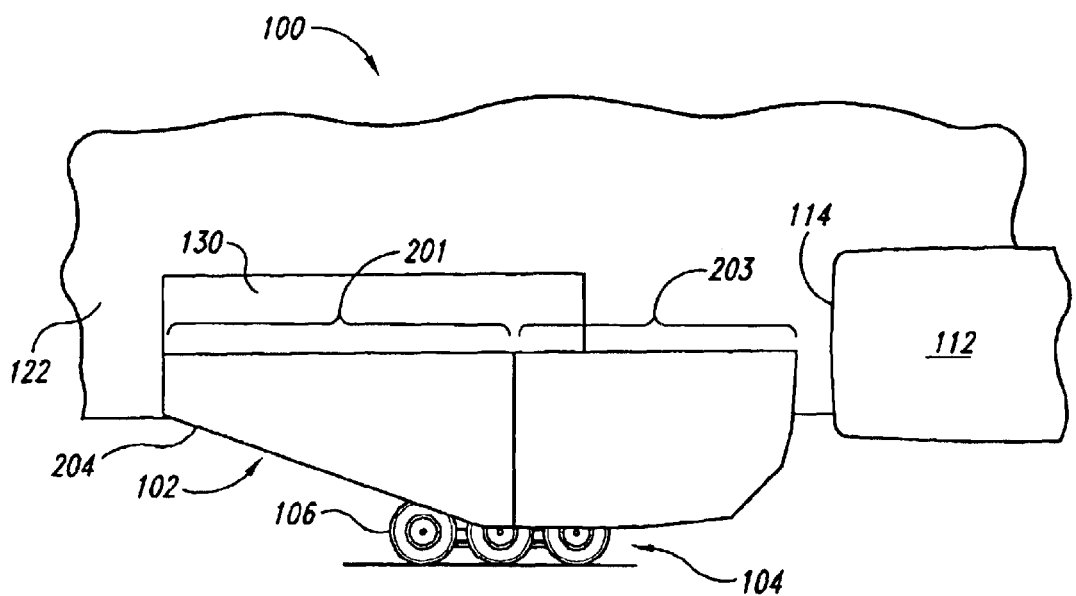
FIG. 2 is a side elevation view of a portion of the aircraft of FIG. 1 illustrating aspects of the blocker assembly configured in accordance with an embodiment of the invention.

FIG. 2 is a side elevation view of a portion of the aircraft 100 of FIG. 1 illustrating the blocker assembly 102 configured in accordance with an embodiment of the invention. In one aspect of this embodiment, the blocker assembly 102 includes a gear door portion 201 and a FOD portion 203. The FOD portion 203 can extend close enough to the ground and far enough aft in the deployed position to block line-of-sight trajectories from the wheel truck 106 to the engine air inlet 114. The gear door portion 201 can be configured to close off at least a portion of the wheel well 130 when the main landing gear 104 is retracted.

In a further aspect of this embodiment, the gear door portion 201 and the FOD door portion 203 can be longitudinally aligned with each other and at least partially integrated as a single hinged panel that can be hydraulically or mechanically deployed as the wheel truck 106 moves into the static deployed position, and mechanically locked in a closed or retracted position when the wheel truck 106 moves into the static retracted position. When the blocker assembly 102 is in the retracted position, the gear door portion 201 can at least partially cover the wheel well 130, while at least part of the FOD portion 203 can be positioned at least approximately flush against the lower wing surface 122 adjacent to the wheel well 130. One advantage of this configuration is that both functions (i.e., wheel well coverage and FOD prevention) can be accomplished without having to construct and integrate two separate mechanical systems into the wing 120. In other embodiments, each of the gear door portion 201 and the FOD portion 203 can cover more or less of the wheel well 130. For example, if the wheel well 130 is extended further aft in the wing 120 than is shown in FIG. 2, then the entire FOD portion 203 can be configured to cover at least a portion of the wheel well 130. In yet other embodiments, the gear door portion 201 and the FOD portion 203 can be separate from each other and independently movable relative to each other.

In a further aspect of this embodiment, the profiles of the gear door portion 201 and the FOD portion 203 are configured to minimize surface area while still providing adequate FOD protection. The profile of the gear door portion 201 can include a swept or highly-swept leading edge 204 to reduce or eliminate vortex shedding from the blocker assembly 102 into the engine air inlet 114. In other embodiments, the gear door portion 201 and the FOD portion 203 can have other profiles without departing from the spirit or scope of the present invention. For example, in another embodiment, the profile of the gear door portion 201 can be at least approximately rectangular without the swept leading edge 204.

Figure 3A:
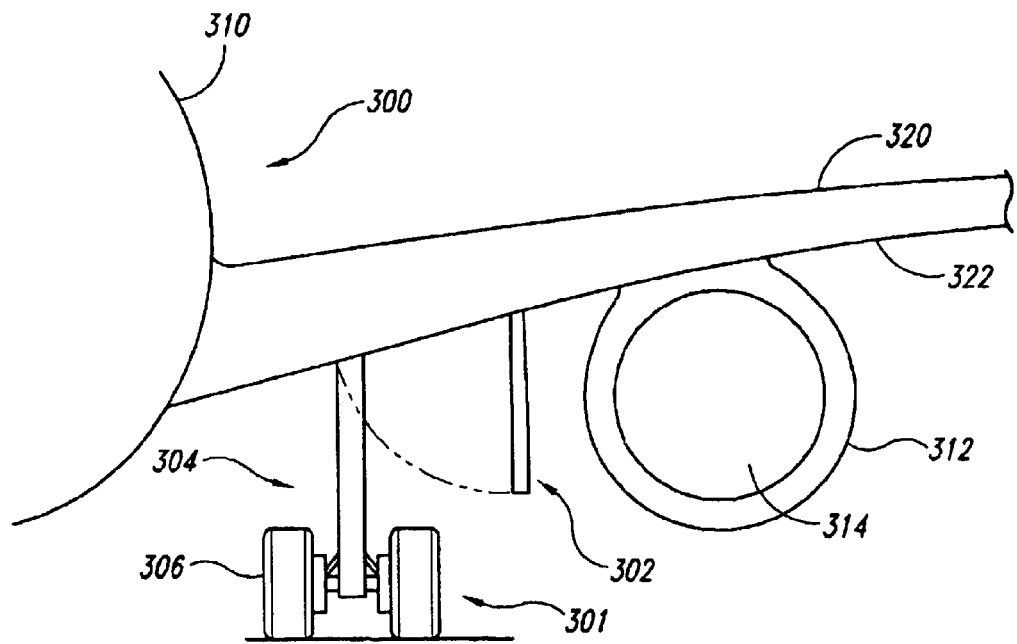
FIG. 3A is a front elevation view.
Figure 3B:
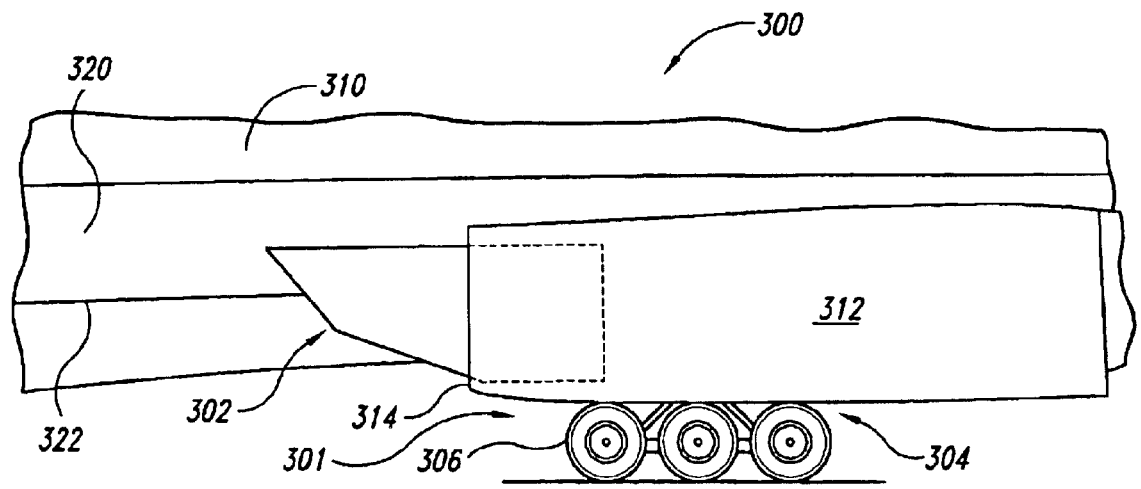
FIG. 3B is a side elevation view, of a portion of an aircraft having a blocker assembly configured in accordance with another embodiment of the invention.

FIG. 3A is a front elevation view, and FIG. 3B is a side elevation view, of a portion of an aircraft 300 having a blocker assembly 302 configured in accordance with another embodiment of the invention. Referring to FIGS. 3A and 3B together, in one aspect of this embodiment, the aircraft 300 has a mid-wing configuration with a wing 320 extending outwardly from a mid portion of a fuselage 310. The aircraft 300 can have a landing gear 301 that includes a main landing gear 304. An engine nacelle 312 is positioned above the landing gear 301. The main landing gear 304 can include a wheel truck 306 and can be at least approximately similar in structure and function to the main landing gear 104 described above with reference to FIG. 1. The engine nacelle 312 can be fixedly attached to a wing lower surface 322 and can include an engine air inlet 314. In contrast to the engine air inlet 114 of FIG. 1, the engine air inlet 314 is positioned forward of the wheel truck 306 when the wheel truck 306 is in a static deployed position as shown in FIG. 3A. Accordingly, debris cannot travel on a direct line-of-sight trajectory from the wheel truck 306 to the engine air inlet 314. As a result, the blocker assembly 302 does not need to extend as far downwardly as the blocker assembly 102 of FIG. 1 to prevent such debris from entering the engine nacelle 312.

Figure 4:
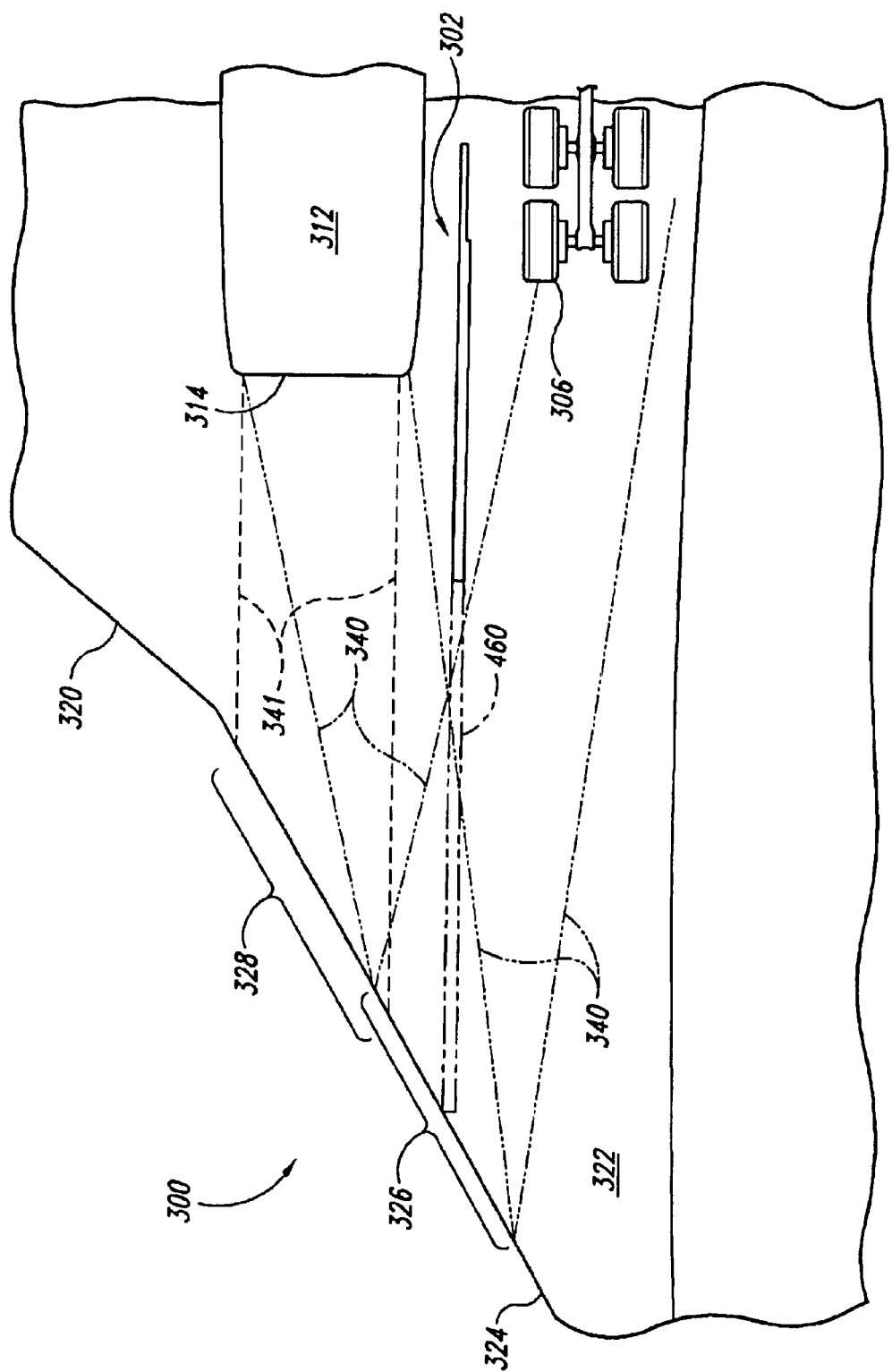
FIG. 4 is a bottom plan view of a portion of the aircraft shown in FIG. 3A, configured in accordance with an embodiment of the invention and illustrating possible ranges of debris trajectories.

FIG. 4 is a bottom plan view of the portion of the aircraft 300 shown in FIGS. 3A and 3B, illustrating ranges of debris trajectories. In one aspect of this embodiment, the wing 320 includes a leading edge 324 positioned forward of the engine air inlet 314. Debris generated or kicked up by the wheel truck 306 can be directed forwardly and upwardly from the wheel truck 306 and can strike the lower wing surface 322 in a first zone 326 (e.g., a bounce zone) or a second zone 328 (e.g., a stick zone). The first (bounce) zone 326 extends laterally inboard from the engine air inlet 314. Debris from the wheel truck 306 striking the first (bounce) zone 326 can bounce or reflect back relative to the aircraft 300 at an angle into the engine air inlet 314, as indicated by bounding trajectories 340 (shown in phantom lines). The second (stick) zone 328 is laterally aligned with the engine air inlet 314, as indicated by dashed lines 341. Debris from the wheel truck 306 striking the second (stick) zone 328 may temporarily stick to the lower wing surface 322 and subsequently detach and travel directly aft relative to the aircraft 300, parallel to the line of flight and into the engine air inlet 314. Accordingly, in the illustrated embodiment, the blocker assembly 302 is expected to prevent all debris from the wheel truck 306 from striking the the second zone 328 and travelling back into the engine air inlet 314. The blocker assembly 302 may not block all debris from the wheel truck 306 from striking the first zone 326.

In another embodiment, the blocker assembly 302 can include an extension 460 (shown in dashed lines in FIG. 4) extending forward toward the wing leading edge 324. The extension 460 can, in one aspect of this embodiment, be fixed relative to the lower wing surface 322. In other embodiments, the extension 460 can be at least partially integrated with the rest of the blocker assembly 302 to hingedly open and close relative to the lower wing surface 322. In any of these embodiments, the extension 460 can completely or at least more completely block debris propelled by the wheel truck 306 from striking the first zone 326.

Figure 5A:
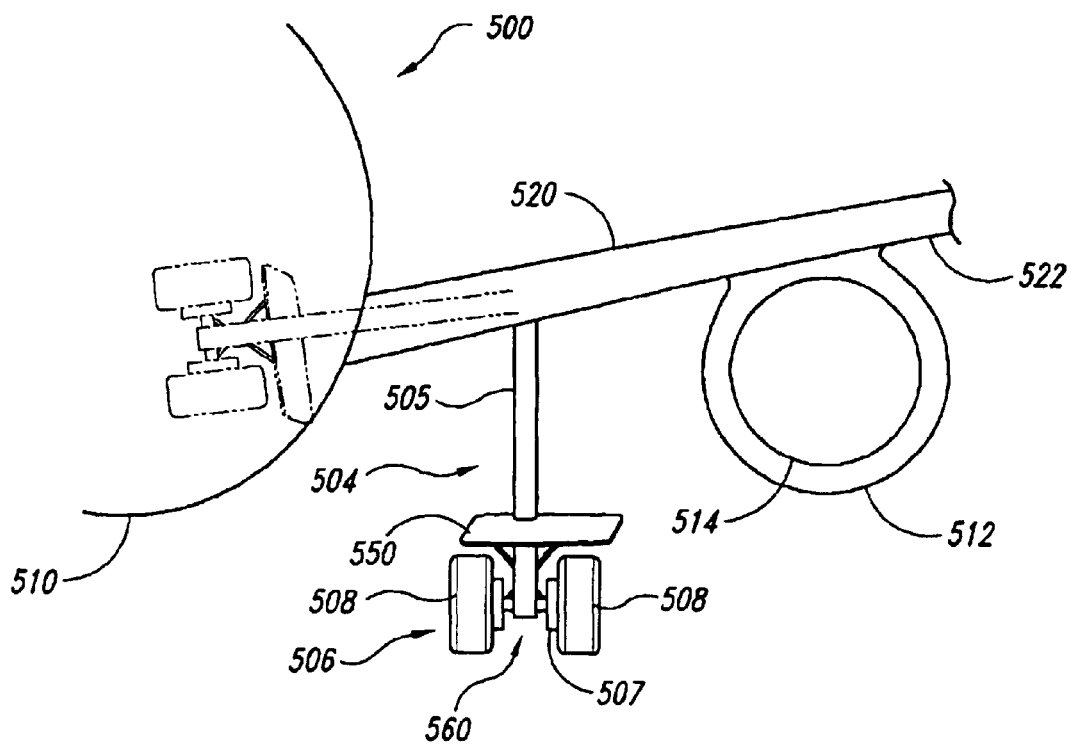
FIG. 5A is a front elevation view.
Figure 5B:
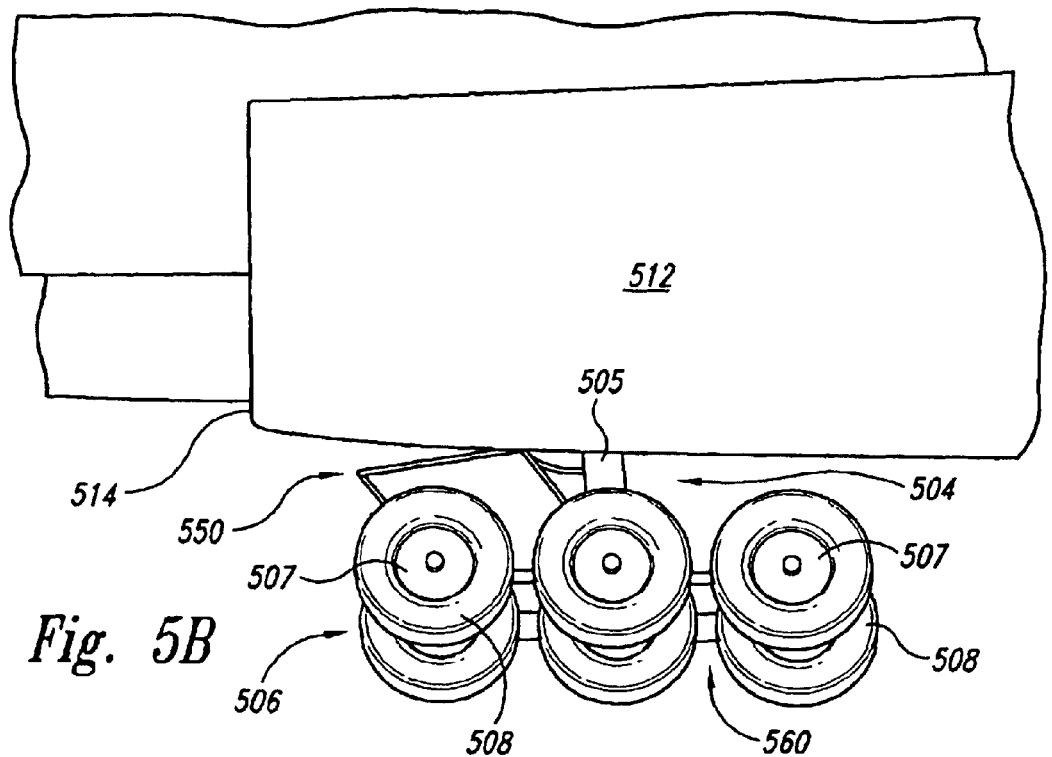
FIG. 5B is a side isometric view, of a portion of an aircraft having a blocker assembly coupled to a landing gear and configured in accordance with an embodiment of the invention.

FIG. 5A is a front elevation view, and FIG. 5B is a side isometric view, of a portion of an aircraft 500 having a blocker assembly 550 (for example, a "FOD bonnet") configured in accordance with an embodiment of the invention. Referring to FIGS. 5A and 5B together, in one aspect of this embodiment, the aircraft 500 includes a main landing gear 504 having a wheel truck 506. The wheel truck 506 includes a chassis 560 that carries wheels 507 with tires 508. The main landing gear 504 can be pivotally attached to a wing 520 with a strut 505 and can be inwardly retractable for stowage at least partially within a fuselage 510 during flight. In other embodiments, the main landing gear 504 can retract in other directions for stowage during flight. For example, in other embodiments, the main landing gear 504 can retract either forwardly or rearwardly for stowage in the wing 520. In another aspect of this embodiment, the aircraft 500 includes an engine nacelle 512 having an engine air inlet 514 positioned forward of the wheel truck 506 in a manner generally similar to that of the engine air inlet 314 described above with reference to FIGS. 3A and 3B. In a further aspect of this embodiment, the blocker assembly 550 can prevent debris directed forward from the wheel truck 506 from striking a lower wing surface 522 and then traveling back relative to the aircraft 500 and into the engine nacelle 512 via the engine air inlet 514.

Figure 6:
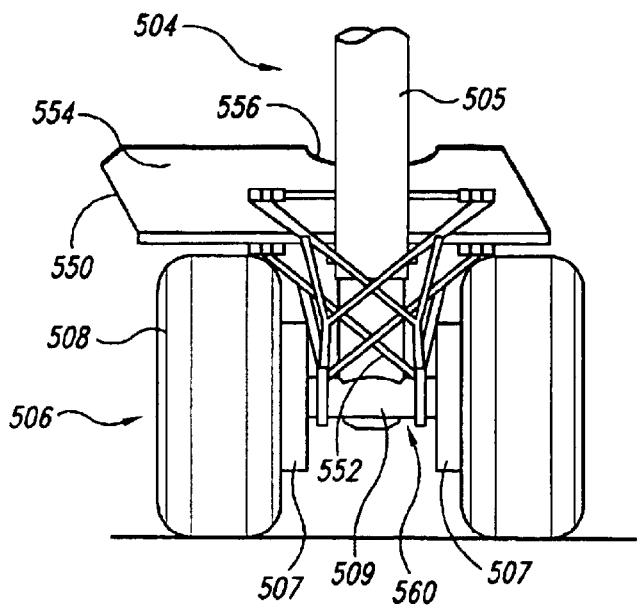
FIG. 6 is an enlarged rear elevation view of a lower portion of a landing gear illustrating aspects of the blocker assembly of FIGS. 5A–5B configured in accordance with an embodiment of the invention.

FIG. 6 is an enlarged rear elevation view of a lower portion of the main landing gear 504 illustrating aspects of the blocker assembly 550 of FIGS. 5A–5B configured in accordance with an embodiment of the invention. In one aspect of this embodiment, the blocker assembly 550 includes a support structure 552 and a deflector panel 554. The deflector panel 554 is positioned above the upper surfaces of the tires 508, and can be at least approximately horizontal with respect to the ground, or inclined upwardly or downwardly as it extends over at least a portion of the wheel truck 506. The deflector panel 554 can extend laterally from the strut 505, and can extend further on one side of the strut 505 than the other, based on the relative position of the engine air inlet 514 (not shown). The deflector panel 554 can further include a cutout 556 to accommodate the strut 505.

In another aspect of this embodiment, the support structure 552 attaches the deflector panel 554 to the chassis 560 of the wheel truck 506. For example, the support structure 552 can be attached to axles 509 on which the wheels 507 are mounted. In other embodiments, the support structure 552 can be attached to other portions of the landing gear 504 or other structural members without departing from the spirit or scope of the present invention. For example, in another embodiment, the blocker assembly 550 can be mounted to at least a portion of the strut 505 instead of the wheel truck chassis 560. In any of these embodiments, the support structure 552 can support the deflector panel 554 from below. One feature of this arrangement is that debris from the wheel truck 506 impacting the deflector panel 554 can impart tension loads on the support structure 552. Tension loads can generally be carried by the structural members of the support structure 552 more efficiently than compression loads. Accordingly, the support structure 552 of the illustrated embodiment can be made lighter than a support structure that carries loads imparted to the deflector panel 554 in compression (e.g., a support structure that carries the deflector panel 554 from above). Another feature of this arrangement is that the deflector panel 554 follows the motion of the tires 508 because the deflector panel 554 is supported by the truck 506. An advantage of this feature is that the deflector panel 554 can more consistently block trajectories originating at the tires 508, even as the tires 508 bounce on the runway, or assume a "toes up" or "toes down" attitude just prior to touchdown or after takeoff.

Figure 7:
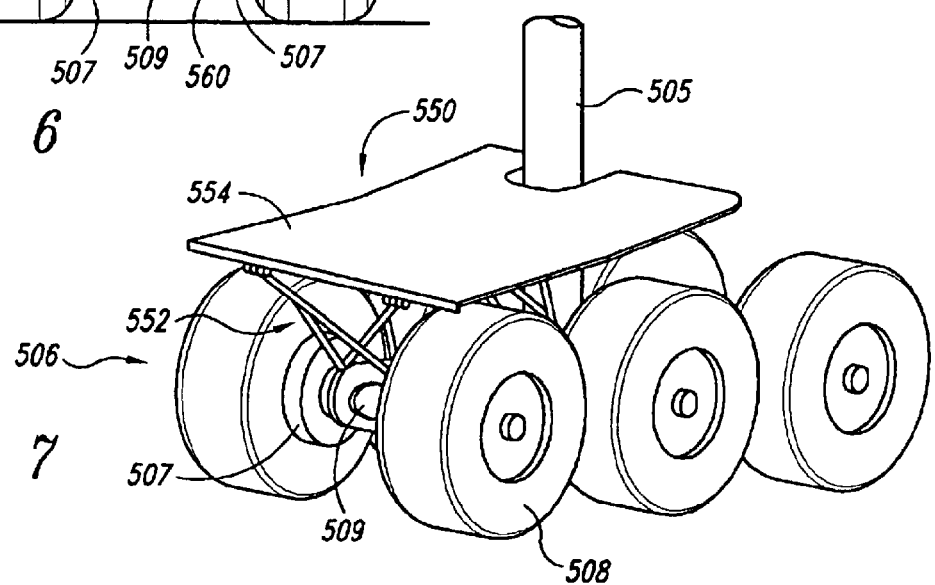
FIG. 7 is an enlarged isometric view of the lower portion of the landing gear of FIG. 6 illustrating aspects of the blocker assembly configured in accordance with an embodiment of the invention.

FIG. 7 is an enlarged isometric view of a lower portion of the landing gear 504 illustrating further aspects of the blocker assembly 550 shown in FIGS. 5A and 5B.

Figure 8:
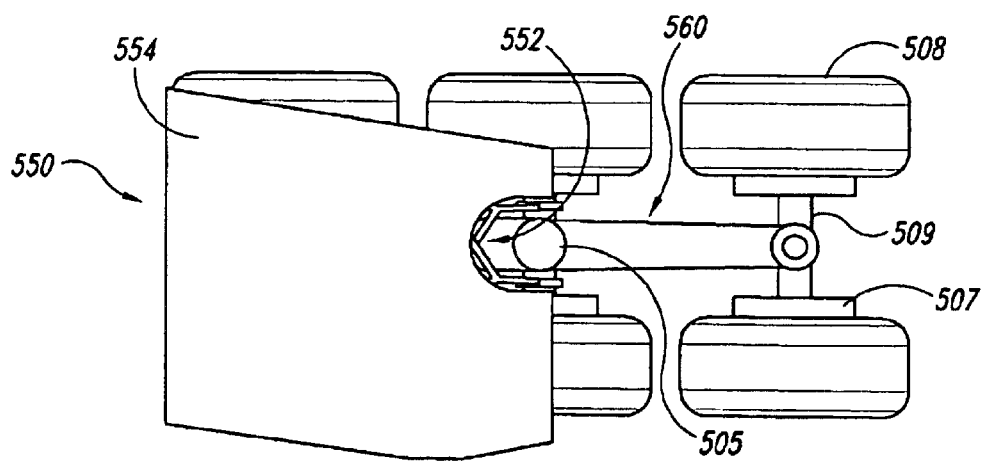
FIG. 8 is a top view of a wheel truck illustrating further aspects of the blocker assembly of FIGS. 5A–7 configured in accordance with yet another embodiment of the invention.

FIG. 8 is a top view of the wheel truck 506 illustrating further aspects of the blocker assembly 550 shown in FIGS. 5A and 5B.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

What is claimed is:

1. An aircraft, comprising:
   a fuselage portion;
   a wing portion coupled to the fuselage portion;
   an engine nacelle depending from at least one of the fuselage portion and the wing portion, the engine nacelle having an air inlet;
   landing gear depending from at least one of the wing portion and the fuselage portion, the landing gear including at least one wheel; and
   a deployable blocker coupled to at least one of the wing portion and the fuselage portion, the blocker being movable between a stowed position and a deployed position, with at least a portion of the blocker being located between the landing gear and the inlet when in the deployed position to prevent at least a solid object propelled by the landing gear from entering the inlet, wherein movement of the blocker is independent of movement of the at least one wheel during touchdown.

2. The aircraft of claim 1 wherein the landing gear is movable between an extended position and a retracted position, and wherein the deployable blocker covers at least a portion of the landing gear when the landing gear is in the retracted position and the blocker is in the stowed position.

3. The aircraft of claim 1 wherein the landing gear is movable between an extended position and a retracted position, and wherein the aircraft includes a wheel well positioned to receive the landing gear when the landing gear is in the retracted position, further wherein the deployable blocker covers at least a portion of the wheel well when the blocker is in the stowed position.

4. The aircraft of claim 1 wherein the wing portion includes an upper surface and a lower surface facing opposite from the upper surface, and wherein the deployable blocker depends from the wing portion of the aircraft and forms part of the lower surface of the wing portion when the deployable blocker is in the stowed position.

5. The aircraft of claim 1 wherein the landing gear includes a main landing gear, and wherein the aircraft further comprises a nose gear forward of the main landing gear.

6. The aircraft of claim 1 wherein the landing gear includes at least one tire and wherein the deployable blocker intersects a straight line extending between the at least one tire and the inlet.

7. The aircraft of claim 1 wherein the wing portion has an upper surface, a lower surface opposite the upper surface and a leading edge, and wherein the inlet is positioned aft of the leading edge.

8. The aircraft of claim 1 wherein the landing gear includes at least one tire and wherein the at least one tire is positioned forward of the inlet.

9. The aircraft of claim 1 wherein the landing gear includes at least one tire and wherein the at least one tire is positioned aft of the inlet.

10. The aircraft of claim 1, further comprising a turbofan engine housed in the engine nacelle.

11. The aircraft of claim 1 wherein the landing gear is movable between a retracted position and an extended position, and wherein the aircraft further comprises a landing gear door movable between an open position and a closed position, the landing gear door covering at least a portion of the landing gear when the landing gear is in the stowed position and the landing gear door is in the closed position, and wherein the landing gear door and the deployable blocker are movable independently of each other.

12. The aircraft of claim 1 wherein the landing gear includes a truck carrying a plurality of wheels, each having at least one tire, and wherein the deployable blocker intersects all straight lines extending directly from all the tires of the truck to the inlet when the blocker is in the deployed position.

13. The aircraft of claim 1 wherein the deployable blocker is generally rigid and sized to block tire fragments released by the landing gear from entering the inlet.

14. The aircraft of claim 1 wherein the blocker is a first blocker and wherein the landing gear includes a truck carrying a plurality of wheels, each having at least one tire, and wherein the aircraft further comprises a second blocker positioned between an upper surface of at least one of the tires and at least one of the wing portion, the fuselage portion and the engine nacelle to intercept at least a solid object propelled by the landing gear, the second blocker being supported by the landing gear from a position below the second blocker.

15. An aircraft, comprising:
a fuselage portion;
a wing portion coupled to the fuselage portion, the wing portion having an upper surface, a lower surface and a leading edge;
an engine nacelle depending from at least one of the fuselage portion and the wing portion, the engine nacelle having an air inlet positioned aft of the leading edge;
landing gear depending from at least one of the wing portion and the fuselage portion, the landing near including at least one wheel; and
a deployable blocker coupled to at least one of the wing portion and the fuselage portion, the blocker being movable between a stowed position and a deployed position, with at least a portion of the blocker being located between the landing gear and the inlet when in the deployed position to prevent at least a solid object propelled by the landing gear from striking the lower surface of the wing portion and then entering the inlet, wherein movement of the blocker is independent of movement of the at feast one wheel during touchdown.

16. The aircraft of claim 15 wherein the blocker is positioned to intersect at least some trajectories originating at the landing gear and bouncing from the lower surface of the wing into the inlet.

17. The aircraft of claim 15 wherein the blocker is positioned to intersect at least some trajectories originating at the landing gear and striking a portion of the wing lower surface positioned forward of and in lateral alignment with the inlet.

18. The aircraft of claim 15 wherein the landing gear is movable between an extended position and a retracted position, and wherein the aircraft includes a wheel well positioned to receive the landing gear when the landing gear is in the retracted position, further wherein the deployable blocker covers at least a portion of the wheel well when the blocker is in the stowed position.

19. The aircraft of claim 15 wherein the wing portion includes an upper surface and a lower surface facing opposite from the upper surface, and wherein the deployable blocker depends from the wing portion of the aircraft and forms part of the lower surface of the wing portion when the deployable blocker is in the stowed position.

20. The aircraft of claim 15 wherein the landing gear includes a main landing gear, and wherein the aircraft further comprises a nose gear forward of the main landing gear.

21. The aircraft of claim 15 wherein the deployable blocker is generally rigid and sized to block tire fragments released by the landing gear from entering the inlet.

22. An aircraft, comprising:
a fuselage portion;
a wing portion coupled to the fuselage portion, the wing portion having an upper surface, a lower surface facing opposite from the upper surface, and a leading edge;
an engine nacelle depending from at least one of the fuselage portion and the wing portion, the engine nacelle having an air inlet positioned aft of the leading edge of the wing portion;
main landing gear depending from at least one of the wing portion and the fuselage portion, the main landing gear including a plurality of tires with at least one of the tires positioned forward of the inlet, the main landing gear being movable between an extended position and a retracted position; and a deployable blocker coupled to at least one of the wing portion and the fuselage portion, the blocker being movable between a stowed position and a deployed position, wherein at least a portion of the blocker intersects a straight line between the inlet and the at least one tire of the main landing gear when in the deployed position to prevent at least a solid object propelled by the at least one tire from entering the inlet, and wherein at least a portion of the deployable blocker covers the main landing gear when the main landing gear is in the retracted position and the deployable blocker is in the stowed position, further wherein movement of the blocker is independent of movement of the at least one tire during touchdown.

23. The aircraft of claim 22 wherein the deployable blocker depends from the wing portion of the aircraft and forms part of the lower surface of the wing portion when the deployable blocker is in the stowed position.

24. The aircraft of claim 22 wherein the deployable blocker intersects all straight lines extending directly from all the tires of the main landing gear to the inlet when the blocker is in the deployed position.

25. The aircraft of claim 22 wherein the deployable blocker is generally rigid and sized to block tire fragments released by the landing gear from entering the inlet.

26. An aircraft, comprising:

a fuselage portion;

a wing portion coupled to the fuselage portion;

an engine nacelle depending from at least one of the fuselage portion and the wing portion, the engine nacelle having an air inlet;

landing gear depending from at least one of the wing portion and the fuselage portion, the landing gear including at least one wheel; and deployable blocker means coupled to at least one of the wing portion and the fuselage portion, the blocker means being movable between a stowed position and a deployed position, with at least a portion of the blocker means being positioned between the main landing gear and the inlet when in the deployed position to prevent at least a solid object propelled by the landing gear from entering the inlet, wherein movement of the blocker means is independent of movement of the at least one wheel during touchdown.

27. The aircraft of claim 26 wherein the landing gear is movable between an extended position and a retracted position, and wherein the deployable blocker means covers at least a portion of the landing gear when the landing gear is in the retracted position and the deployable blocker means is in the stowed position.

28. The aircraft of claim 26 wherein the wing portion includes an upper surface and a lower surface facing opposite from the upper surface, and wherein the deployable blocker means depends from the wing portion of the aircraft and forms part of the lower surface of the wing portion when the deployable blocker means is in the stowed position.

29. The aircraft of claim 26 wherein the landing gear includes at least one tire and wherein the deployable blocker means intersects a straight line extending between the at least one tire and the inlet.

30. The aircraft of claim 26 wherein the wing portion has an upper surface, a lower surface opposite the upper surface and a leading edge, and wherein the inlet is positioned aft of the leading edge.

31. The aircraft of claim 26 wherein the landing gear includes at least one tire and wherein the at least one tire is positioned forward of the inlet.

32. The aircraft of claim 26 wherein the landing gear includes a truck carrying a plurality of wheels, each having at least one tire, and wherein the deployable blocker means intersects all straight lines extending directly from all the tires of the truck to the inlet when the deployable blocker means is in the deployed position.

33. The aircraft of claim 26 wherein the deployable blocker means includes generally rigid panel sized to block tire fragments released by the landing gear from entering the inlet.

34. A method for protecting an aircraft inlet from foreign object ingestion, comprising:

extending the landing gear of an aircraft;

engaging a wheel of the landing gear with the ground;

moving the aircraft along the ground on the landing gear; and preventing at least a solid object propelled by the landing gear from entering an engine inlet of the aircraft by moving a deployable blocker coupled to at least one of a wing portion and a fuselage portion of the aircraft from a stowed position to a deployed position to place at least a portion of the blocker between the landing gear and the inlet, independent of the motion of the wheel of the landing gear as the wheel engages the ground.

35. The method of claim 34 wherein preventing at least a solid object from entering the inlet includes preventing a tire fragment from entering the inlet.

36. The method of claim 34 wherein preventing at least a solid object from entering the inlet includes preventing an object picked up and released by the landing gear from entering the inlet.

37. The method of claim 34 wherein preventing at least a solid object from entering the inlet includes preventing a solid object from following a trajectory directly from the landing gear to the inlet.

38. The method of claim 34 wherein preventing at least a solid object from entering the inlet includes preventing a solid object from striking at least one of the wing portion and the fuselage portion and bouncing into the inlet.

39. The method of claim 34 wherein preventing at least a solid object from entering the inlet includes preventing a solid object from striking at least one of the wing portion and the fuselage portion, sticking to the at least one of the wing portion and the fuselage portion, and falling into the inlet.

40. The method of claim 34 wherein preventing at least a solid object from entering the inlet includes preventing water propelled by the landing gear from entering the inlet.

41. A method for manufacturing an aircraft, comprising:

coupling a wing portion to a fuselage portion;

coupling an engine nacelle to at least one of the fuselage portion and the wing portion, the engine nacelle having an air inlet;

attaching landing gear to at least one of the wing portion and the fuselage portion, the landing gear including at least one wheel; and mounting a deployable blocker to at least one of the wing portion and the fuselage portion, the deployable blocker being movable between a stowed position and a deployed position, with at least a portion of the deployable blocker being located between the landing gear and the inlet when in the deployed position to prevent at least a solid object propelled by the landing gear from entering the inlet, wherein motion of the blocker is independent of movement of the at least one wheel during touchdown.

42. The method of claim 41 wherein the landing gear is movable between an extended position and a retracted position, and wherein mounting a deployable blocker includes coupling the deployable blocker to cover at least a portion of the landing gear when the landing gear is in the retracted position and the deployable blocker is in the stowed position.

43. The method of claim 41 wherein the wing portion includes an upper surface and a lower surface facing opposite from the upper surface, and wherein mounting the deployable blocker includes coupling the deployable blocker to depend from the wing portion of the aircraft and form part of the lower surface of the wing portion when the deployable blocker is in the stowed position.

44. The method of claim 41 wherein the landing gear includes at least one tire and wherein the mounting the deployable blocker includes mounting the deployable blocker to intersect a straight line extending between the at least one tire and the inlet.

45. The method of claim 41 wherein the wing portion has an upper surface, a lower surface opposite the upper surface, and a leading edge, and wherein coupling an engine nacelle includes coupling an engine nacelle with the inlet positioned aft of the leading edge.

46. The method of claim 41 wherein attaching a landing gear includes attaching a landing gear having at least one tire positioned forward of the inlet.

47. The method of claim 41 wherein the landing gear includes a truck carrying a plurality of wheels, each having at least one tire, and wherein mounting the deployable blocker includes mounting the deployable blocker to intersect all straight lines extending directly from all the tires of the truck to the inlet when the deployable blocker is in the deployed position.

48. The method of claim 41 wherein mounting the deployable blocker includes mounting a generally rigid blocker sized to block tire fragments released by the landing gear from entering the inlet.

49. An aircraft, comprising:

a fuselage portion;

a wing portion coupled to the fuselage portion, the wing portion having a leading edge, an upper surface, and a lower surface facing opposite the upper surface;

an engine nacelle depending from at least one of the fuselage portion and the wing portion, the engine nacelle having an air inlet;

landing gear depending from at least one of the fuselage portion and the wing portion, the landing gear including a strut coupled to a truck having a plurality of rotatable wheels and tires; and a blocker having a blocker device positioned between an upper surface of at least one of the tires and at least one of the wing portion, the fuselage portion and the engine nacelle to intercept at least a solid object propelled by the landing gear, the blocker device being supported by the landing gear from a position below the blocker device, wherein:

a generally downwardly facing surface of the blocker is accessible when the landing gear is moved to a deployed position;

motion of the blocker generally follows motion of the landing gear from a stowed position to the deployed position; and the blocker moves toward at least one of the tires as the landing gear strut compresses during landing.

50. The aircraft of claim 49, further comprising at least one support member extending downwardly from the blocker device to the truck.

51. The aircraft of claim 49 wherein the blocker device is supported by the truck.

52. The aircraft of claim 49 wherein the truck includes at least one axle and wherein the aircraft further comprises a plurality of support members pivotably coupled to the blocker device and pivotably coupled to the axle.

53. The aircraft of claim 49 wherein the blocker device includes a generally rigid panel sized to block tire fragments released by the landing gear from entering the inlet.

* * * * *

UNITED STATES PATENT AND TRADEMARK OFFICE
CERTIFICATE OF CORRECTION

PATENT NO. : 6,845,943 B2
DATED : January 25, 2005
INVENTOR(S) : David S. Chambers et al.

It is certified that error appears in the above-identified patent and that said Letters Patent is hereby corrected as shown below:

<u>Column 8,</u>
Line 16, "near" should be -- gear --;
Line 27, "feast" should be -- least --;

Signed and Sealed this

Twenty-sixth Day of April, 2005

JON W. DUDAS
*Director of the United States Patent and Trademark Office*